United States Patent
Kanaya

(10) Patent No.: US 11,401,401 B2
(45) Date of Patent: Aug. 2, 2022

(54) RUBBER COMPOSITION FOR INNER LINER AND PNEUMATIC TIRE USING THE SAME

(71) Applicant: Toyo Tire Corporation, Itami (JP)

(72) Inventor: Masaki Kanaya, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 0 days.

(21) Appl. No.: 17/117,518

(22) Filed: Dec. 10, 2020

(65) Prior Publication Data

US 2021/0179811 A1  Jun. 17, 2021

(30) Foreign Application Priority Data

Dec. 13, 2019  (JP) ............... JP2019-225586

(51) Int. Cl.
  *C08K 5/41* (2006.01)
  *B60C 1/00* (2006.01)

(52) U.S. Cl.
  CPC ............. *C08K 5/41* (2013.01); *B60C 1/0008* (2013.01)

(58) Field of Classification Search
  CPC .................................................. B60C 1/0008
  See application file for complete search history.

(56) References Cited

U.S. PATENT DOCUMENTS

| | | | | |
|---|---|---|---|---|
| 4,417,012 A * | 11/1983 | Moniotte | .............. | C07C 381/02 524/83 |
| 5,698,640 A * | 12/1997 | Duvdevani | .............. | C08K 5/41 525/333.4 |
| 2004/0106735 A1 * | 6/2004 | Tsou | ..................... | C08L 23/22 525/191 |
| 2005/0027058 A1 * | 2/2005 | Dias | ..................... | C08L 23/283 524/445 |
| 2005/0222335 A1 * | 10/2005 | Jones | ..................... | C08L 23/22 525/191 |
| 2006/0100339 A1 * | 5/2006 | Gong | ..................... | C08K 3/346 524/445 |
| 2006/0135660 A1 * | 6/2006 | Hoopes | ..................... | C08K 5/42 524/105 |
| 2006/0167184 A1 * | 7/2006 | Waddell | ..................... | C08K 5/01 525/192 |
| 2009/0005493 A1 * | 1/2009 | Tse | ..................... | B60C 1/0008 524/502 |
| 2010/0024941 A1 * | 2/2010 | Hara | ..................... | B60C 1/0008 152/510 |
| 2010/0036019 A1 * | 2/2010 | Miyazaki | ..................... | C08L 9/06 523/157 |
| 2010/0249278 A1 * | 9/2010 | Miyazaki | ..................... | C08L 21/00 523/438 |

(Continued)

FOREIGN PATENT DOCUMENTS

| JP | 3683372 B2 | 8/2005 |
|---|---|---|
| JP | 2008-144023 A | 6/2008 |
| JP | 2009-138148 A | 6/2009 |

*Primary Examiner* — Liam J Heincer
(74) *Attorney, Agent, or Firm* — WHDA, LLP

(57) ABSTRACT

Provided are a rubber composition for an inner liner having excellent air permeability resistance and low temperature fatigue resistance, and a pneumatic tire using the same. The rubber composition for an inner liner contains 0.05 to 0.9 parts by mass of 1,6-hexamethylene dithiosulfate sodium dihydrate with respect to 100 parts by mass of a rubber component, in which a whole sulfur content is less than 0.3 parts by mass.

14 Claims, 1 Drawing Sheet

(56) References Cited

U.S. PATENT DOCUMENTS

| | | | |
|---|---|---|---|
| 2011/0094645 A1* | 4/2011 | Rodgers | B60C 1/0008 |
| | | | 152/510 |
| 2015/0337904 A1* | 11/2015 | Auer | F16D 3/78 |
| | | | 464/93 |
| 2019/0144654 A1* | 5/2019 | Nair | B60C 1/0041 |
| | | | 524/81 |
| 2020/0040170 A1* | 2/2020 | Araujo Da Silva | C08L 23/083 |
| 2020/0056017 A1* | 2/2020 | Belin | C08L 9/06 |
| 2021/0130593 A1* | 5/2021 | Araujo Da Silva | C08K 3/04 |

\* cited by examiner

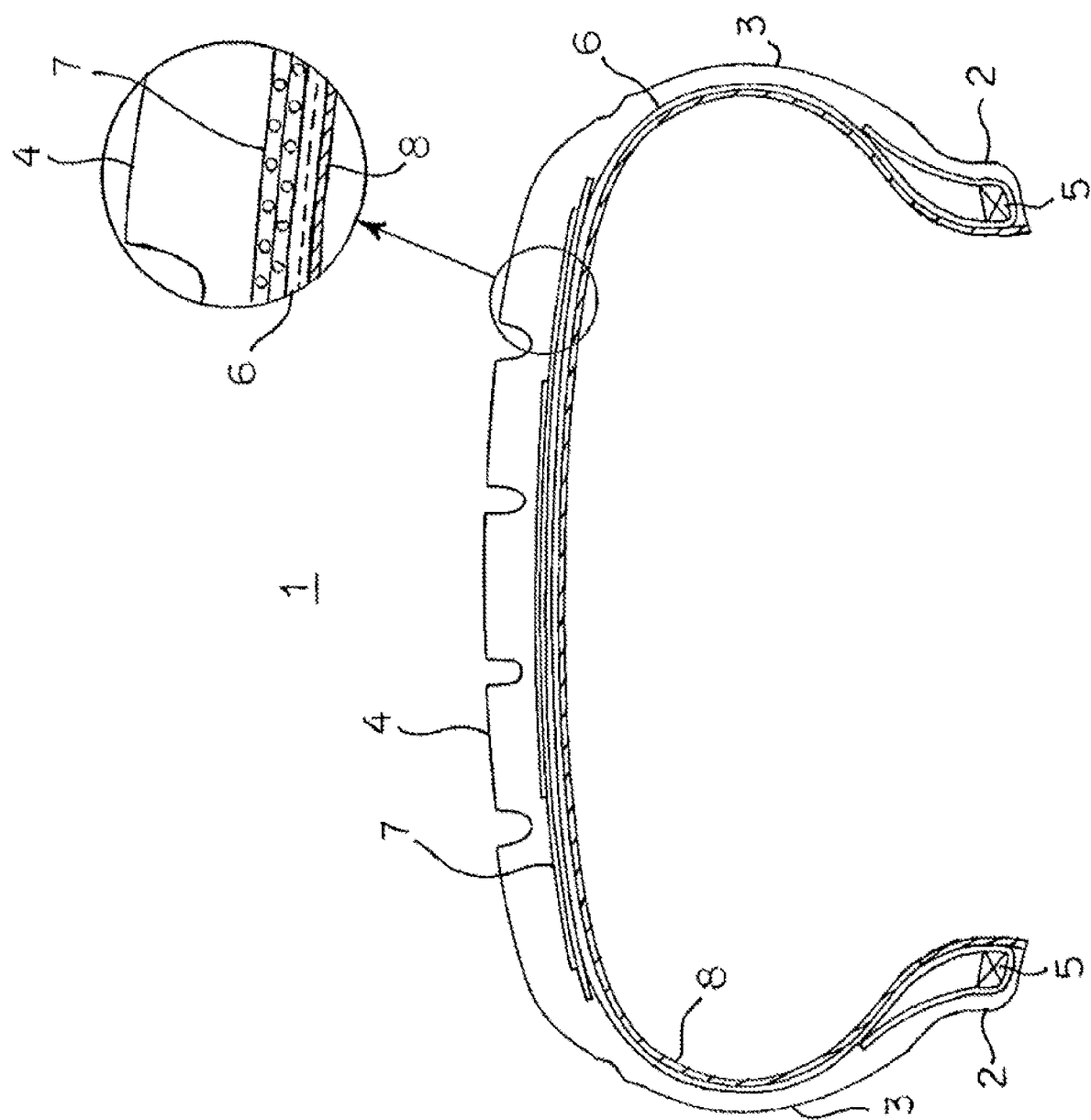

RUBBER COMPOSITION FOR INNER LINER AND PNEUMATIC TIRE USING THE SAME

BACKGROUND OF THE INVENTION

1. Field of the Invention

The present disclosure relates to a rubber composition for an inner liner and a pneumatic tire using the same.

2. Description of Related Art

An inner liner is provided on an inner surface of a pneumatic tire as an air permeation preventing layer in order to keep the tire air pressure constant. The inner liner is generally formed of a layer of rubber such as butyl rubber or butyl halogenated rubber with low air permeability.

For example, JP-A-2009-138148 discloses a rubber composition for an inner liner including, with respect to 100 parts by weight of (A) a rubber component including 60 to 100% by weight of a butyl rubber, 21 to 50 parts by weight of (B) carbon black and/or silica and 0.25 to 6 parts by weight of an alkylphenol/sulfur chloride condensate, in which whole sulfur content is 0.3 to 1.5 parts by weight.

JP-A-2008-144023 discloses, as a rubber composition with low heat generation and excellent durability and deterioration resistance, which is suitable for an interlayer rubber located between a carcass and an inner liner, a rubber composition which includes 1,6-hexamethylene dithiosulfate sodium dihydrate.

Since the inner liner undergoes repeated bending deformation due to the rolling of the pneumatic tire, the rubber composition used for the inner liner is preferably excellent in strength (fatigue resistance) against repeated bending deformation, and is particularly desired to have excellent low temperature fatigue resistance in low temperature environments.

SUMMARY OF THE INVENTION

In view of the above points, an object of the present disclosure is to provide a rubber composition for an inner liner having excellent air permeability resistance and low temperature fatigue resistance, and a pneumatic tire using the same.

JP-A-2009-138148 and JP-A-2008-144023 do not provide any suggestion about the characteristics in low temperature environments.

Japanese Patent No. 3683372 also describes a rubber composition using 1,6-hexamethylene dithiosulfate sodium dihydrate, but is related to a tubeless pneumatic tire without an inner liner and does not provide any suggestion for the present disclosure.

A rubber composition for an inner liner according to the present disclosure contains 0.05 to 0.9 parts by mass of 1,6-hexamethylene dithiosulfate sodium dihydrate with respect to 100 parts by mass of a rubber component, in which a whole sulfur content is less than 0.3 parts by mass.

In the rubber composition for an inner liner according to the present disclosure, the content ratios in 100 parts by mass of the rubber component can be 30 to 100% by mass of butyl rubber and 0 to 70% by mass of diene rubber.

A pneumatic tire of the present disclosure is manufactured by using the rubber composition for an inner liner described above.

According to the rubber composition for an inner liner of the present disclosure, a pneumatic tire having excellent air permeability resistance and low temperature fatigue resistance can be obtained.

BRIEF DESCRIPTION OF DRAWINGS

The FIGURE is a cross-sectional view showing a pneumatic tire according to an embodiment of the present disclosure.

DESCRIPTION OF EMBODIMENTS

Hereinafter, matters related to the embodiments of the present disclosure will be described in detail.

A rubber composition for an inner liner according to the present embodiment contains 0.05 to 0.9 parts by mass of 1,6-hexamethylene dithiosulfate sodium dihydrate with respect to 100 parts by mass of a rubber component, in which the whole sulfur content is less than 0.3 parts by mass.

The rubber composition according to the present embodiment is not particularly limited, and examples thereof include butyl rubber and diene rubber, and preferably, the butyl rubber alone or a combination of the butyl rubber and the diene rubber.

Examples of the butyl rubber according to the present embodiment include a butyl halogenated rubber (for example, a brominated butyl rubber (BIIR), a chlorinated butyl rubber (CIIR), and the like), and a butyl rubber (IIR).

Examples of the diene rubber according to the present embodiment include a natural rubber (NR), an isoprene rubber (IR), a butadiene rubber (BR), a styrene-butadiene rubber (SBR), a nitrile rubber (NBR), a chloroprene rubber (CR), and a styrene-isoprene rubber, a butadiene-isoprene rubber, a styrene-butadiene-isoprene rubber, and the like.

The rubber component according to the present embodiment preferably contains butyl rubber and diene rubber at a ratio of 30 to 100% by mass of butyl rubber and 0 to 70% by mass of diene rubber, more preferably, at a ratio of 50 to 100% by mass of butyl rubber and 0 to 50% by mass of diene rubber, and still more preferably, at a ratio of 80 to 100% by mass of butyl rubber and 0 to 20% by mass of diene rubber.

The content of 1,6-hexamethylene dithiosulfate sodium dihydrate according to the present embodiment is not particularly limited as long as it is 0.05 to 0.9 parts by mass with respect to 100 parts by mass of the rubber component, but it is preferably 0.05 to 0.5 parts by mass, and more preferably 0.1 to 0.25 parts by mass in consideration of fatigue resistance.

By containing 1,6-hexamethylene dithiosulfate sodium dihydrate, the rubber composition according to the present embodiment can have improved low temperature fatigue resistance while maintaining air permeability resistance. The precise mechanism is not clear, but can be inferred as follows. That is, 1,6-hexamethylene dithiosulfate sodium forms a crosslinked structure between the polymers, which acts as a spacer between the polymers, so that butyl rubber is less likely to crystallize in a low temperature environment and the flexibility of the entire rubber composition is maintained, thereby improving low temperature fatigue resistance. It can be inferred that the diffusion of gas is inhibited by the formation of the crosslinked structure between the polymers by 1,6-hexamethylene dithiosulfate sodium.

The whole sulfur content of the rubber composition according to the present embodiment is less than 0.3 parts by mass, preferably 0.2 parts by mass or less, and more preferably 0.1 parts by mass or less with respect to 100 parts by mass of the rubber component. When the whole sulfur content is within the ranges described above, excellent low temperature fatigue resistance can be easily obtained. The whole sulfur content of the present disclosure does not include a sulfur other than the sulfur discharged in the rubber and involved in cross-linking. For example, sulfur contained in di-2-benzothiazolyl disulfide ("NOCCELER DM-P" manufactured by Ouchi Shinko Chemical Industrial Co., Ltd.) or the like that can be compounded as a vulcanization accelerator is not included.

The rubber composition according to the present embodiment can include a pulverized bituminous coal obtained by finely crushing bituminous coal. The pulverized bituminous coal can improve air permeability resistance. The average particle size of the pulverized bituminous coal is preferably 0.5 to 100 µm, and more preferably 1 to 30 µm. The average particle size can be measured by the laser diffraction/scattering method.

The pulverized bituminous coal having an aspect ratio of 5 to 30 can be used, for example. The aspect ratio is a ratio to the thickness of a long diameter (maximum dimension in the flat surface portion). The aspect ratio can be determined with the transmission electron microscope (TEM). Specifically, in a TEM image, the long diameter and the thickness of 10 randomly selected particles are measured to calculate the aspect ratio of each particle. The "aspect ratio of the pulverized bituminous coal" is the arithmetic mean of the aspect ratios.

The amount of the pulverized bituminous coal is preferably 5 to 50 parts by mass or more, more preferably 5 to 40 parts by mass, and still more preferably 5 to 30 parts by mass with respect to 100 parts by mass of the rubber component.

The rubber composition according to the present embodiment may contain carbon black as a filler. The iodine adsorption (IA) amount by carbon black can be 15 mg/g to 55 mg/g, for example. The iodine adsorption amount is a value measured in accordance with JIS K6217-1. The absorption amount of dibutyl phthalate (DBP) oil by carbon black can be, for example, 75 cm$^3$/100 g to 125 cm$^3$/100 g. The DBP oil absorption amount is a value measured in accordance with JIS K6217-4. Specifically, GPF grade carbon black is preferable.

The content of carbon black is preferably 30 to 70 parts by mass, and more preferably 40 to 60 parts by mass with respect to 100 parts by mass of rubber component in the rubber composition.

The total amount of carbon black and the pulverized bituminous coal is preferably 35 to 120 parts by mass, more preferably 40 to 110 parts by mass, and still more preferably 50 to 100 parts by mass with respect to 100 parts by mass of the rubber component in the rubber composition.

Zinc oxide may be added to the rubber composition according to the present embodiment. The zinc oxide is added as a vulcanizing agent (crosslinking agent) for butyl halogenated rubber, and added in an amount of preferably 0.5 to 10 parts by mass, and more preferably 1 to 5 parts by mass with respect to 100 parts by mass of the rubber component.

A tackifying agent may be added to the rubber composition according to the present embodiment. The tackifying agent is an additive that imparts stickiness to unvulcanized rubber composition, and is also referred to as a tackifier. The tackifying agent is preferably hydrocarbon resin such as aliphatic petroleum resin, aromatic petroleum resin, and aliphatic/aromatic copolymer petroleum resin, and more preferably, C5-based petroleum resin obtained by cationically polymerizing an unsaturated monomer such as isoprene or cyclopentadiene which is a petroleum fraction equivalent to 4 to 5 carbon atoms. The amount of the tackifying agent is not particularly limited, but is preferably 1 to 15 parts by mass, and more preferably 2 to 10 parts by mass with respect to 100 parts by mass of the rubber component.

The method for producing the rubber composition according to the present embodiment is not particularly limited, and can be produced by kneading with a commonly used mixing machine, such as a Banbury mixer, a kneader, or a roll, according to a method of the related arts. For example, a rubber composition can be prepared by adding other additives excluding a vulcanizing agent and a vulcanization accelerator to the diene rubber followed by kneading in a first mixing stage (non-processing kneading process), and then adding a vulcanizing agent and a vulcanization accelerator to the resultant mixture followed by kneading in a final mixing step (processing kneading process).

In addition to the components described above, various additives usually added in the rubber composition for an inner liner, such as an age resister, an oil, a processing aid, sulfur, and a vulcanization accelerator, can be added in the rubber composition according to the present embodiment. Examples of sulfur include powdered sulfur, precipitated sulfur, colloidal sulfur, insoluble sulfur, and highly dispersible sulfur, and is preferably added in an amount of 0.28 parts by mass or less (may not be added), and more preferably 0.1 parts by mass or less with respect to 100 parts by mass of the rubber component. The amount of the oil is preferably 5 parts by mass or less with respect to 100 parts by mass of the rubber component, and is preferably not substantially contained (specifically, less than 1 part by mass) from the viewpoint of gas permeability resistance.

The rubber composition for an inner liner according to the present embodiment can be applied to various pneumatic tires such as tires for various automobiles including tires for passenger cars, heavy-duty tires for trucks, buses and the like, and tires for two-wheeled vehicles including bicycles.

The FIGURE is a cross-sectional view showing a pneumatic tire 1 according to an embodiment. As shown, the pneumatic tire 1 includes a pair of bead portions 2 to be rim-assembled, a pair of sidewall portions 3 extending outward in the radial direction of the tire from the bead portions 2, and a tread portion 4 provided between the pair of sidewall portions 3 and grounded on the road surface. A ring-shaped bead core 5 is embedded in each of the pair of bead portions 2. A carcass ply 6 using an organic fiber cord is folded around the bead core 5 and locked, and is provided to be bridged between the left and right bead portions 2. On an outer peripheral side of the tread portion 4 of the carcass ply 6, a belt 7 formed of two belt plies using a rigid tire cord such as a steel cord or an aramid fiber is provided.

Inside the carcass ply 6, an inner liner 8 is provided over the entire inner surface of the tire. In the present embodiment, the rubber composition for an inner liner is used as the inner liner 8. The inner liner 8 is attached to the inner surface of the carcass ply 6, which is the rubber layer on the inner surface side of the tire, as shown in the enlarged view in the FIGURE, and more specifically, is attached to the inner surface of a topping rubber layer covering the cord of the carcass ply 6.

A method for manufacturing a pneumatic tire according to the present embodiment includes, for example, with the rubber composition for an inner liner as an inner liner, mounting the inner liner in a tubular shape on an outer circumference of a molding drum, attaching a carcass ply thereon, further assembling and inflating each tire member such as a belt, tread rubber and sidewall rubber to produce a green tire (unvulcanized tire), and vulcanizing and molding the green tire in a mold to produce a pneumatic tire. In the example shown in the FIGURE, although the rubber composition for an inner liner is provided on the inner surface side of the carcass ply, as long as the tire pressure can be maintained by preventing the permeation of air from the inside of the tire, that is, as long as the rubber composition for an inner liner is provided as an air permeation preventing layer for maintaining the internal pressure, the rubber composition for an inner liner can be provided at various positions such as on the outer surface side of the carcass ply, and there is no particular limitation thereto.

EXAMPLES

Hereinafter, certain examples of the present disclosure are described below, but the present disclosure is not construed as being limited to the examples.

By using a Banbury mixer, the components excluding the vulcanization accelerator were first added and mixed in the non-processing kneading step (discharge temperature=150° C.) according to the formulation (parts by mass) shown in Table 1 below, and in the processing kneading step, the vulcanization accelerator was added and mixed (discharge temperature=90° C.) to prepare a rubber composition for an inner liner. The details of each components in Table 1 are as follows.

Brominated butyl rubber: "Bromobutyl 2222" manufactured by JAPAN BUTYL Co., Ltd.
Carbon black: "SEAST V" manufactured by Tokai Carbon Co., Ltd.
Pulverized bituminous coal: "Austin Black 325" manufactured by Coal Fillers, Inc.
Tackifying agent: "T-REZ RA100" manufactured by Tonen Chemical Corp.
Oil: "PROCESS NC-140" manufactured by JXTG Nippon Oil & Energy Corp.
1,6-hexamethylene dithiosulfate sodium dihydrate: "Duralink HTS" manufactured by Flexsystems Inc., mass ratio of sulfur in one molecule=32.8 mass %
Zinc oxide: "Zinc Oxide 3 Species" manufactured by Mitsui Mining & Smelting Co., Ltd.
Stearic acid: "LUNAC S-20" manufactured by Kao Corporation
Vulcanization accelerator: "NOCCELER-DM-P" manufactured by Ouchi Shinko Chemical Industrial Co., Ltd.

The obtained rubber composition was evaluated for air permeability resistance and low temperature fatigue resistance. Each evaluation method is as follows.

Air permeability resistance: For a vulcanized rubber sheet with a thickness of 1 mm that was vulcanized at 160° C. for 30 minutes, the air permeability was measured using a gas permeability tester ("BT-3" manufactured by Toyo Seiki Seisaku-sho, Ltd.), and an index was represented relative to the value of Comparative Example 1 as 100. It is demonstrated that as the numerical value is larger, the air permeability resistance is better.

Low temperature fatigue resistance: In accordance with JIS K6260, the number of times of flexing of a test sample vulcanized at 160° C. for 30 minutes was measured at −35° C. until the crack length reached 10 mm with a De Mattia flex test device. An index was represented relative to the number of flexing in Comparative Example 1 as 100, and it is demonstrated that, as the numerical value is smaller, the low temperature flexural fatigue resistance is better. The length of the naturally occurring crack was added to the crack length.

TABLE 1

| | Com.1 | Com.2 | Com.3 | Ex.1 | Ex.2 | Ex.3 |
|---|---|---|---|---|---|---|
| Brominated butyl rubber | 100 | 100 | 100 | 100 | 100 | 100 |
| Carbon black | 50 | 50 | 50 | 50 | 50 | 50 |
| Pulverized bituminous coal | 10 | 10 | 10 | 10 | 10 | 10 |
| Tackifying agent | 3 | 3 | 3 | 3 | 3 | 3 |
| 1,6-hexamethylene dithiosulfate sodium dehydrate | — | — | 1 | 0.05 | 0.1 | 0.5 |
| Oil | 5 | 10 | 5 | 5 | 5 | 5 |
| Zinc oxide | 3 | 3 | 3 | 3 | 3 | 3 |
| Stearic acid | 1 | 1 | 1 | 1 | 1 | 1 |
| Vulcanization accelerator | 2 | 2 | 2 | 2 | 2 | 2 |
| Whole sulfur content | 0 | 0 | 0.328 | 0.016 | 0.033 | 0.164 |
| Air permeability resistance | 100 | 75 | 98 | 104 | 105 | 102 |
| Low temperature fatigue resistance | 100 | 90 | 30 | 60 | 40 | 35 |

The results are as shown in Table 1, and from the comparison between Comparative Example 1 and Examples 1 to 3, it can be seen that when the content of 1,6-hexamethylene dithiosulfate sodium dihydrate and the whole sulfur content are within predetermined ranges, the air permeability resistance and the low temperature fatigue resistance were improved.

From the comparison between Comparative Examples 1 and 2, it can be seen that the air permeability resistance was deteriorated when the amount of oil was increased.

From the comparison between Comparative Examples 1 and 3, it can be seen that when the content of 1,6-hexamethylene dithiosulfate sodium dihydrate exceeds a predetermined range, the air permeability resistance is deteriorated.

The rubber composition for an inner liner according to the present disclosure can be used for the inner liners of various tires of passenger cars, light duty trucks, buses and the like.

What is claimed is:

1. A rubber composition for an inner liner containing 0.05 to 0.9 parts by mass of 1,6-hexamethylene dithiosulfate sodium dihydrate with respect to 100 parts by mass of a rubber component, wherein a whole sulfur content is less than 0.2 parts by mass.

2. The rubber composition for an inner liner according to claim 1, wherein in 100 parts by mass of the rubber component, a content ratio is 30 to 100% by mass for butyl rubber and 0 to 70% by mass for diene rubber.

3. A pneumatic tire manufactured by using the rubber composition for an inner liner according to claim 2.

4. A pneumatic tire manufactured by using the rubber composition for an inner liner according to claim 1.

5. The rubber composition for an inner liner according to claim 1, comprising 0.05 to 0.5 parts by mass of 1,6-hexamethylene dithiosulfate sodium dihydrate with respect to 100 parts by mass of the rubber component.

6. The rubber composition for an inner liner according to claim 5, wherein the whole sulfur content is 0.164 or less parts by mass.

7. A pneumatic tire manufactured by using the rubber composition for an inner liner according to claim 6.

8. A pneumatic tire manufactured by using the rubber composition for an inner liner according to claim 5.

9. The rubber composition for an inner liner according to claim 1, further comprising 30 to 70 parts by mass of carbon black with respect to 100 parts by mass of the rubber component.

10. The rubber composition for an inner liner according to claim 9, further comprising 5 to 50 parts by mass of a pulverized bituminous coal with respect to 100 parts by mass of the rubber component.

11. The rubber composition for an inner liner according to claim 10, wherein a total amount of carbon black and the pulverized bituminous coal is 40 to 110 parts by mass with respect to 100 parts by mass of the rubber component.

12. A pneumatic tire manufactured by using the rubber composition for an inner liner according to claim 11.

13. A pneumatic tire manufactured by using the rubber composition for an inner liner according to claim 9.

14. A pneumatic tire manufactured by using the rubber composition for an inner liner according to claim 10.

* * * * *